United States Patent
Zhang et al.

(10) Patent No.: US 12,483,785 B2
(45) Date of Patent: Nov. 25, 2025

(54) HIGH-SENSITIVITY THREE-DIMENSIONAL TOPOGRAPHY RECOVERY METHOD BASED ON DUAL-CHANNEL DIFFERENTIATION

(71) Applicant: FUDAN UNIVERSITY, Shanghai (CN)

(72) Inventors: Xiangchao Zhang, Shanghai (CN); Yunuo Chen, Shanghai (CN); Wei Lang, Shanghai (CN); Sihan Chen, Shanghai (CN); Chengzhuo Wang, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 0 days.

(21) Appl. No.: 18/672,049

(22) Filed: May 23, 2024

(65) Prior Publication Data
US 2024/0430565 A1    Dec. 26, 2024

(30) Foreign Application Priority Data
Jun. 24, 2023   (CN) .......................... 202310743961.0

(51) Int. Cl.
*G01C 11/02*    (2006.01)
*G02B 21/00*    (2006.01)
*H04N 23/67*    (2023.01)

(52) U.S. Cl.
CPC ......... *H04N 23/67* (2023.01); *G02B 21/0036* (2013.01); *G02B 21/008* (2013.01)

(58) Field of Classification Search
CPC ... H04N 23/67; G02B 21/0036; G02B 21/008
See application file for complete search history.

(56) References Cited

FOREIGN PATENT DOCUMENTS

CN        113510536 A  * 10/2021
DE    102014108353 A1 * 12/2014    .......... G01B 11/007

OTHER PUBLICATIONS

Authors—Yuezong Wang; Xin Zhang; Hao Chen Title—Depth Measurement for the Objects with a Small Height Using Depth-Focus-Based Microscopic Vision System Title of the Conference—IEEE International Conference on Mechatronics and Automation Year—2020 pp. 653-658.

* cited by examiner

*Primary Examiner* — Patrick E Demosky
(74) *Attorney, Agent, or Firm* — Addison D. Ault; IPGentleman Intellectual Property Services, LLC

(57) ABSTRACT

The invention relates to precision measurement technology, specifically a high-sensitivity three-dimensional topography recovery method using dual-channel differentiation. Enhancing a traditional microscopic imaging system, a beam splitter is added between the objective lens and tube lens. This creates an additional light path equipped with a tube lens and camera identical to the original but with a slightly different distance to the camera. During axial scanning of the object, focusing evaluation function curves for each pixel are calculated from images captured by both cameras. The curves from the two cameras show more significant changes near the optimal focusing depth, improving system sensitivity. This method enhances sensitivity by hardware-fixed differentiation of the focusing evaluation function, while maintaining high scanning efficiency and flexible configuration.

2 Claims, 5 Drawing Sheets

HIGH-SENSITIVITY THREE-DIMENSIONAL TOPOGRAPHY RECOVERY METHOD BASED ON DUAL-CHANNEL DIFFERENTIATION

TECHNICAL FIELD

The invention belongs to the field of precision measurement technology, and specifically relates to a three-dimensional surface topography recovery method.

BACKGROUND ART

Three-dimensional topography recovery based on microscopic imaging system is an optical detection method with the advantages of non-contact, large dynamic range and high accuracy. Its ability to reconstruct the topography of high-slope surfaces can meet the special detection requirements of some precision parts. In recent years, it has attracted widespread attentions in the fields of medicine, aviation and aerospace [Y. Wang, X. Zhang, and H. Chen, "Depth Measurement for the Objects with a Small Height Using Depth-Focus-Based Microscopic Vision System", 2020 IEEE International Conference on Mechatronics and Automation: 653-658].

The core of the three-dimensional topography recovery is to find the optimal focusing depth during the scanning process. Therefore, a reliable focusing evaluation function is the key of the measurement method. For a fixed lateral position, the value of the focusing evaluation function is determined by the scanning depth. At the optimal focusing depth, the focusing evaluation function achieves the maximum value. Generally speaking, an ideal focusing evaluation function should have the properties of single peak, high sensitivity and strong robustness at the same time. For a long time, researchers have proposed a variety of focusing evaluation functions suitable for different situations, which constantly promote the development of three-dimensional measurement [S. Pertuz, D. Puig, and M. Garcia, 'Analysis of focus measure operators for topography-from-focus', Pattern Recognition 2013; 46:1415-1432]. Unfortunately, due to the imaging characteristics of the optical system, the current focusing evaluation function curve is generally Gaussian-like, which means that the change of the focusing evaluation function is very slow with respect to the depth near the recording depth (the optimal focusing depth), which undoubtedly results in a decrease in measurement sensitivity. Moreover, when the noise in the data acquisition process becomes significant, a smooth focusing evaluation function will result in serious problems like false focusing and low robustness. This problem severely limits the application of three-dimensional topography recovery method based on microscopic imaging system in some ultra-precision detection situations.

Therefore, the invention is proposed to solve the problem of low sensitivity of the three-dimensional topography recovery method near the recording depth without significantly increasing the hardware cost and system complexity, while ensuring the high efficiency of the measurement and the flexibility of the scanning configuration.

SUMMARY

The purpose of the invention is to provide a high-sensitivity three-dimensional topography recovery method based on microscopic imaging system, without significantly increasing the measurement time or hardware cost.

The high-sensitivity three-dimensional topography recovery method provided by the invention is based on the dual-channel differentiation technology, comprising scanning an object under test through axially moving an objective lens or the entire microscopic imaging system using a microscopic imaging system. For lateral positions corresponding to each pixel, the focusing evaluation function curve respect to the scanning depth is calculated, and the stable amount of differentiation is guaranteed by a fixed difference between the distances between the cameras and the tube lenses on the two light paths. By subtracting the focusing evaluation functions corresponding to the two cameras, a steeper evaluation function curve near the optimal focusing depth is obtained so as to improve the sensitivity of the system; the details are as follows:

1. Construction of measurement system, comprising microscopic measurement system and motion control mechanism;

The microscopic measurement system comprises the following components: two cameras of the same type, two tube lenses of the same type, two beam splitters of the same type, objective lens, stage, converging lens and light source;

Among them, arranging the first camera, the first tube lens, the first beam splitter, the second beam splitter, the objective lens and the stage coaxially from top to bottom in the setup to form the imaging light path; using the stage to place the object under test at a proper position; arranging the second tube lens and the second camera on a light path of the first beam splitter in turn; and arranging the converging lens and the light source on the other light path;

The relative distances between the two sets of tube lenses and cameras are different, and the distance difference is fixed, which is a preset small amount, such as 10~100 μm. When the first camera images a point clearly, the second camera captures the de-focused image of the point;

The motion control mechanism comprises a motor and a grating, which are used to control the axial movement of the objective lens or the entire microscopic imaging system.

2. Axial scanning and focusing evaluation:

(1) Fixing the object under test on the stage, adjusting the objective lens or the entire microscopic imaging system, and determining the axial positions of the highest and lowest points of the object under test that can be clearly imaged, so as to set the scanning range and scanning step;

(2) According to the scanning range and scanning step, capturing a set of image sequences containing n images by using the two cameras, and denoting them as $Ii1$, $Ii2$, ($i=1, 2, \ldots, n$) respectively;

(3) Selecting the focusing evaluation function according to the actual situation, such as the Sobel function, Laplace function, etc., calculating the pixel-level focusing evaluation function values for the captured image sequences. Obtaining m focusing evaluation function curves for m pixels and denoting them as $Si1$ and $Si2$, ($i=1, 2, \ldots, m$), and using them to represent the degrees of focusing at different scanning depths.

3. Differentiation and three-dimensional reconstruction:

(1) Because there is only one corresponding optimal focusing depth for each lateral position, and the focusing evaluation function curve corresponding to lateral position has the maximum value in the optimal focusing depth. So $Si1$ and $Si2$ are subject to the trend of increasing first and then decreasing with respect to the scanning depth, and generating a new curve Fi representing the differentiation between Si1 and Si2:

In the new function Fi, the optimal focusing depth corresponds to the zero point of the evaluation function. In contrary with the Gaussian-like functions Si1 and Si2, the change near the optimal focusing depth is steeper, so it has higher sensitivity to the depth change and stronger anti-noise capability.

(2) Fitting the zero point for Fi respectively for each pixel, combining all the lateral positions, denoting the height map of all the focusing depths as the restored three-dimensional topography.

On the basis of the traditional microscopic imaging system, adding a beam splitter between the objective lens and the tube lens, equipped with a tube lens and a camera, which are identical with the original light path, and making the distance between the tube lens and the camera slightly different from the original one. In the process of axially moving the objective lens to scan the object under test, calculating the focusing evaluation function curves corresponding to each pixel from the images captured by the two cameras, subtracting the focusing evaluation function curves associated with the two cameras, which changes more dramatically near the optimal focusing depth, so as to improve the sensitivity of testing. The invention fixes the amount of differentiation between the two focusing evaluation functions through hardware setup, which can ensure the efficiency of scanning and the flexibility of scanning configuration while improving the sensitivity.

BRIEF DESCRIPTION OF THE DRAWINGS

In FIG. 1, the markings are as follows: 1 and 9 are two cameras of the same type, 2 and 8 are two tube lenses of the same type, 3 and 4 are beam splitters of the same type, 5 is the objective lens, 6 is the object under test, 7 is the stage, 10 is the converging lens, and 11 is the light source. The dotted line represents the imaging light path, and the solid line represents the illumination light path.

DETAILED DESCRIPTION OF THE EMBODIMENTS

The invention is further introduced below through specific embodiment and drawings. However, the embodiment does not constitute a limitation to the invention. All other embodiments obtained by ordinary technicians in this field without making creative labor belong to the protection scope of the invention.

Figure 1:
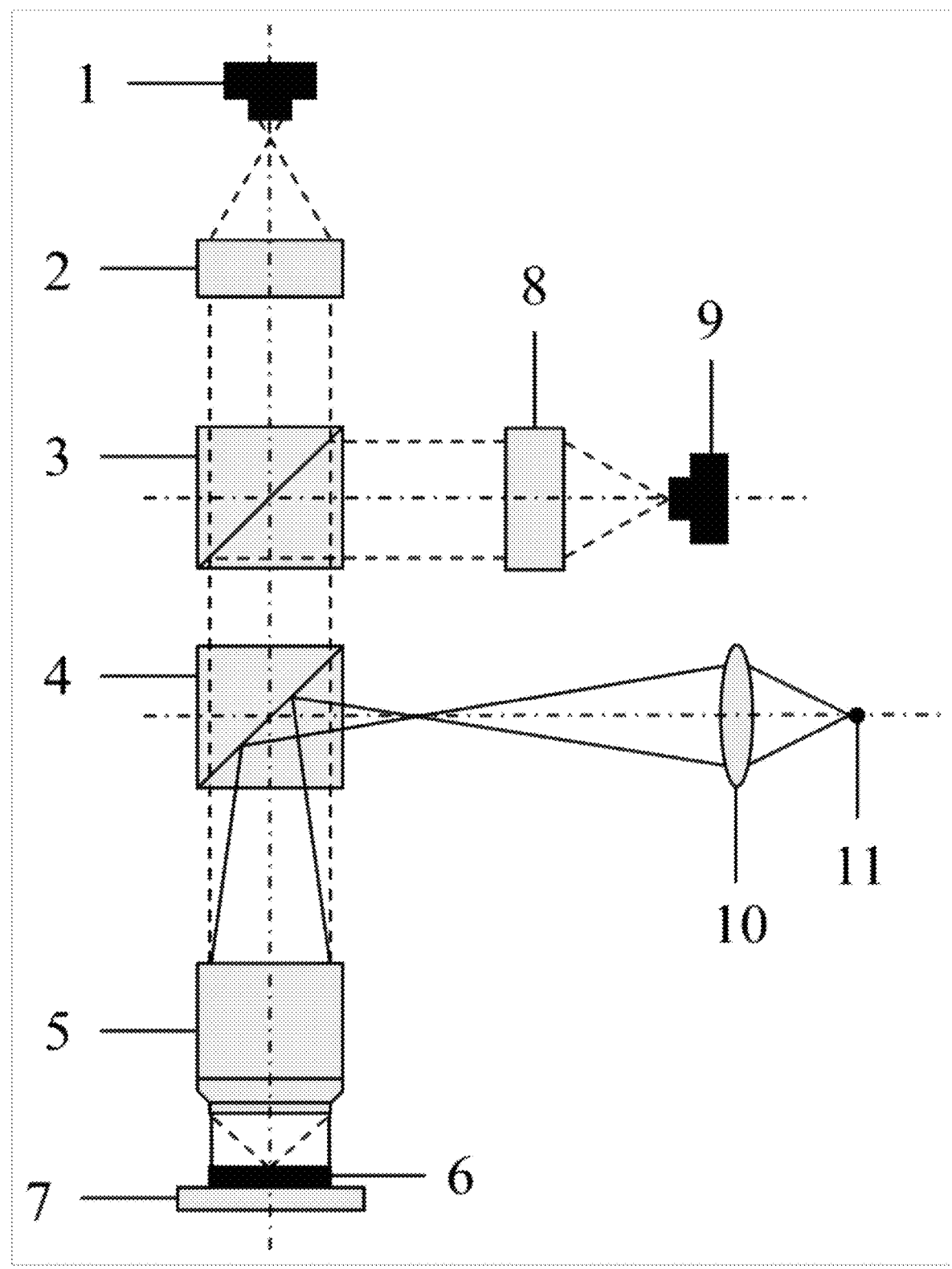
FIG. 1 is the schematic diagram of the microscopic measurement system.
Figure 2:
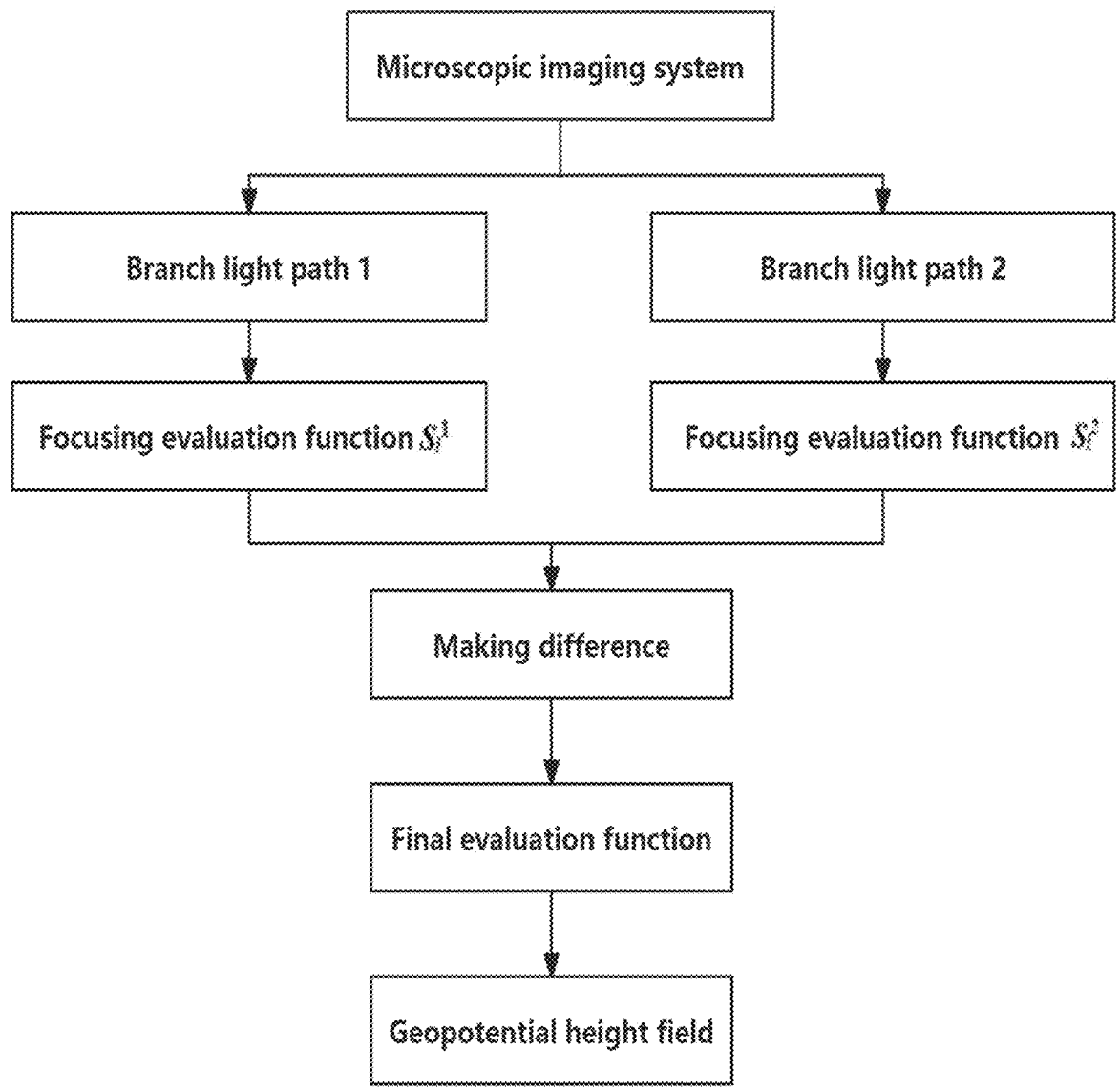
FIG. 2 is the flow chart of the method in this invention.

Embodiment 1: the microscopic measurement system designed by the invention is shown in FIG. 1, comprising two cameras of the same type 1 and 9, two tube lenses of the same type 2 and 8, two beam splitters 3 and 4, objective lens 5, stage 7, converging lens 10, and light source 11. Among them, the first camera 1, the first tube lens 2, the first beam splitter 3, the second beam splitter 4, the objective lens 5, and the stage 7 are arranged coaxially from top to bottom on the light path to form an imaging light path; stage 7 is used to place the object under test 6 at a proper position; the second tube lens 8 and the second camera 9 are arranged on the light path of the first beam splitter 3 in turn. The converging lens 10 and the light source 11 are arranged on the light path of the second beam splitter 4 in turn to form the illumination light path. In FIG. 1, the dotted line represents the imaging light path, and the solid line represents the illumination light path. The relative distances between the two sets of tube lenses and cameras are different, and the difference between the distances is fixed to be a small amount 10~100 μm. When the first camera clearly images an object point, the second camera captures the de-focused image of the object point. The measurement system also comprises motion mechanisms such as motors and gratings, which are used to realize the axial movement of the objective lens or the entire microscopic imaging system. In addition, the numerical aperture of the microscope objective lens 6 is 0.25 and the working distance is 6.5 mm.

Figure 3:
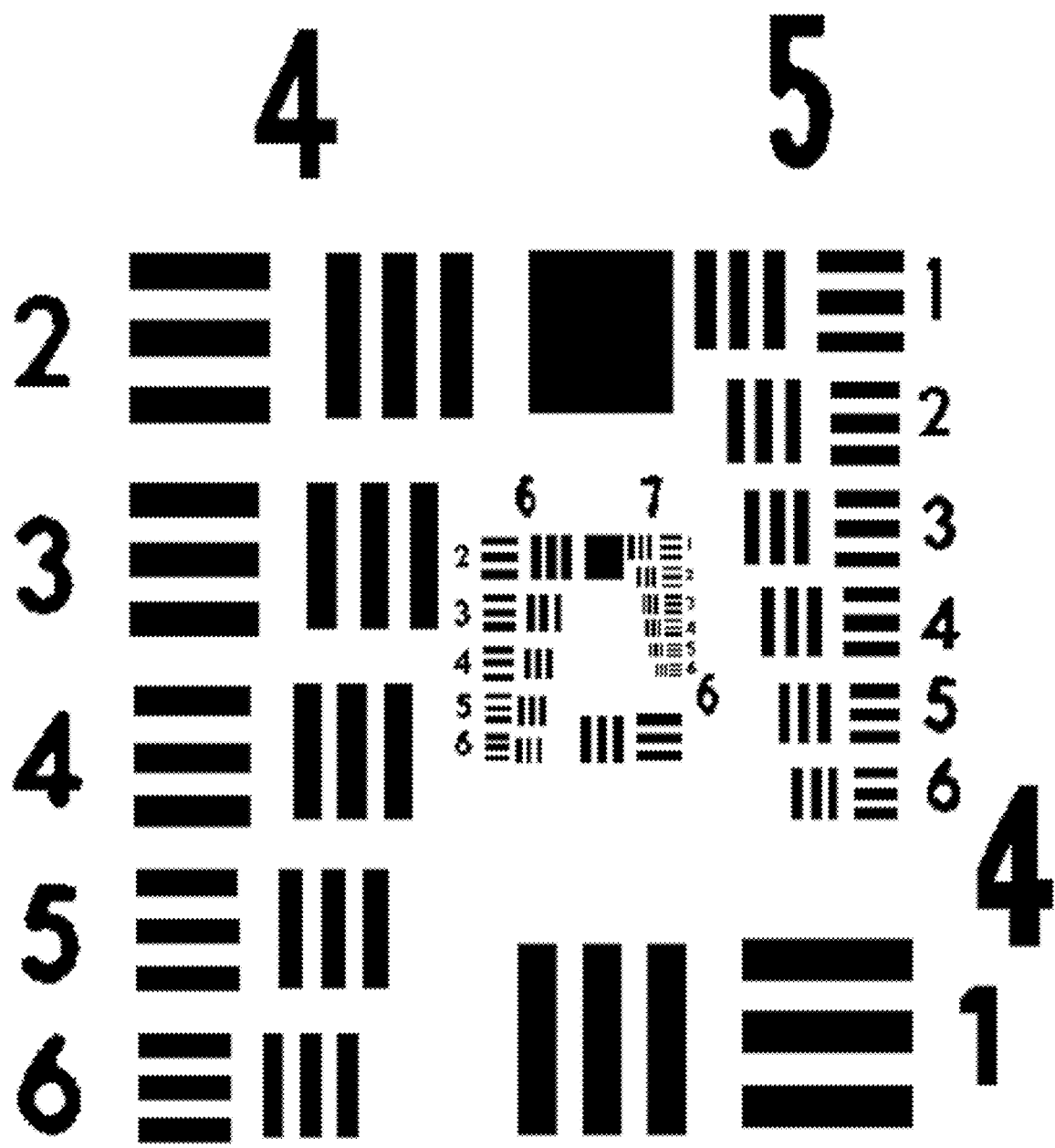
FIG. 3 shows the resolution plate measured in Embodiment 1.
Figure 4:
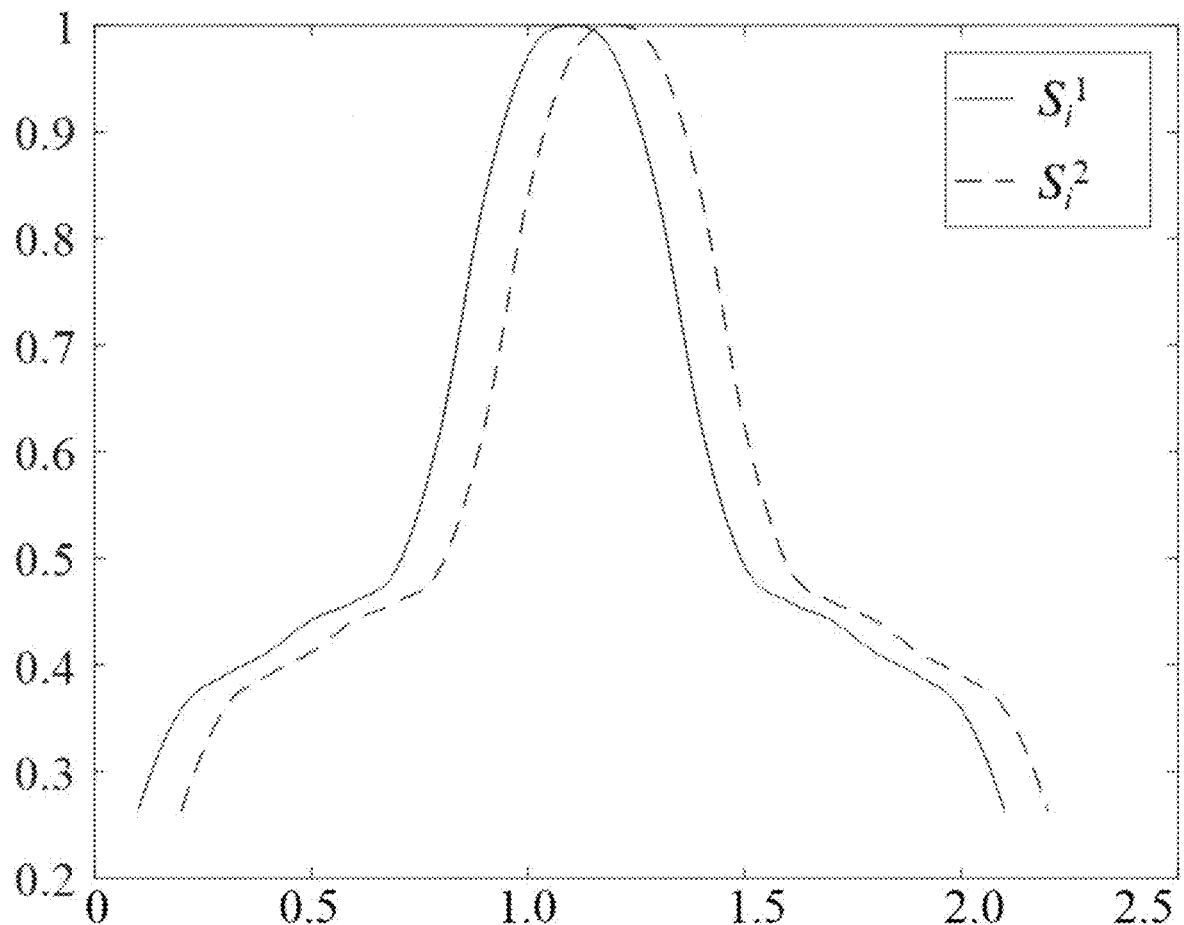
FIG. 4 shows the curve of the traditional focusing evaluation function with respect to depth in Embodiment 1.

A resolution plate with a binary pattern placed at a fixed height as shown in FIG. 3 is measured. The scanning range is 2.0 mm and the scanning step is 10 μm. The Sobel function is used as the focusing evaluation function, for the lateral position corresponding to a pixel (150, 250), the changing curves of normalized two focusing evaluation functions with respect to depth are drawn, as shown in FIG. 4. At this time, the recording depth corresponds to the optimal focusing depth during the scanning process, that is, the focusing evaluation function curve achieves the maximum value. It can be seen that the changes of the two focusing evaluation curves near this position are relatively slow, which makes the focusing metric less sensitive to the depth, and the depth recovery results are susceptible to noise.

Figure 5:
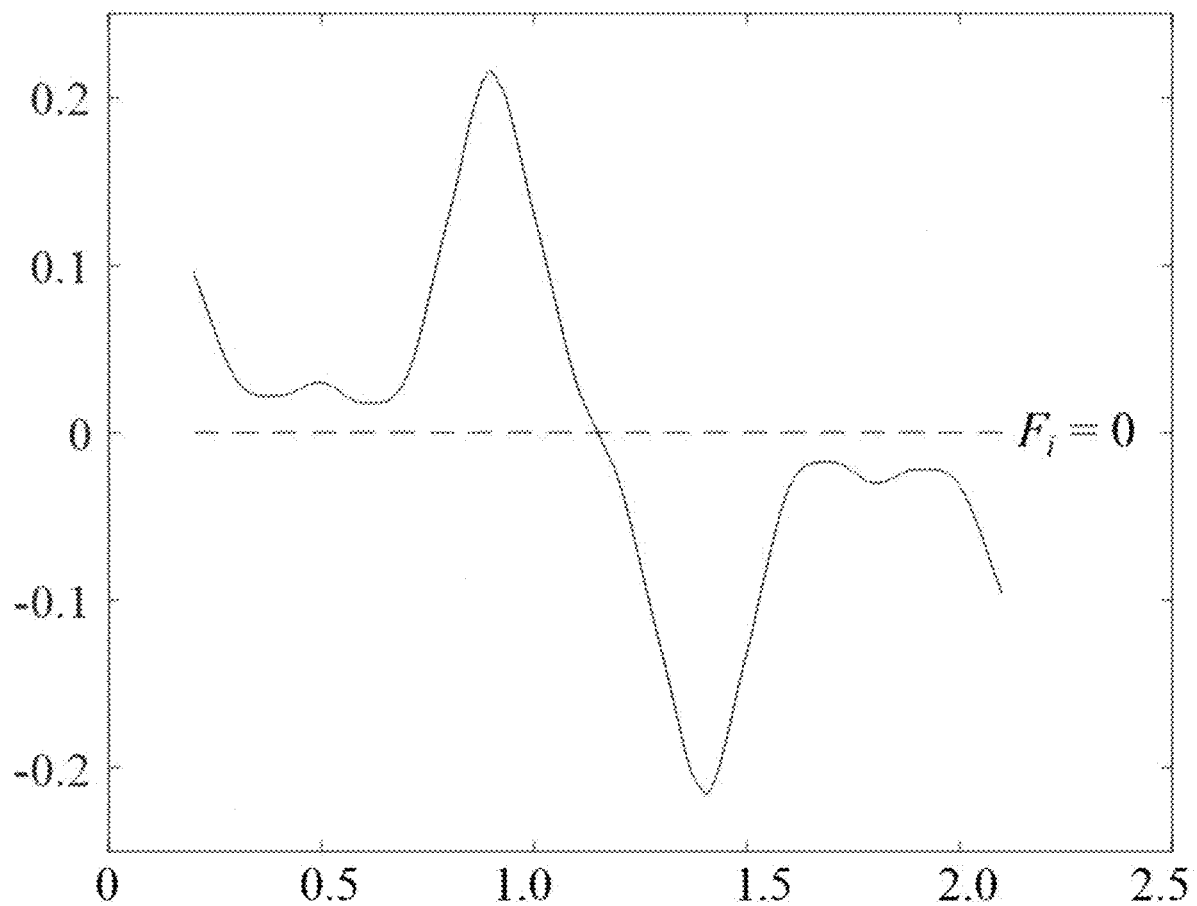
FIG. 5 shows the change of the differentiation curve between two focusing evaluation function curves with respect to depth in Embodiment 1.

The differentiation between the two focusing evaluation functions is shown in FIG. 5. At this time, the recording depth corresponds to the zero point of the evaluation function. For the axial deviation with a relative recording depth of 0.1 mm, the variations of the overall peak-to-valley values of the original focusing evaluation function curve and the differentiation function curve are 3.97% and 18.16% respectively. It can be seen that the invention method can provide higher axial sensitivity for three-dimensional topography recovery.

What is claimed is:

1. A three-dimensional topography recovery method based on dual-channel differentiation technology, comprising scanning an object under test through axially moving an objective lens or an entire microscopic imaging system by using a microscopic imaging system; for lateral positions corresponding to each pixel, a focusing evaluation function curve with respect to a scanning depth is calculated, and a stable differentiation amount is guaranteed by a fixed difference between distances between cameras and tube lenses on two light paths, by subtracting the focusing evaluation function curves associated with the two cameras, a steeper evaluation function curve of only one optimal focusing depth of each lateral position is obtained to improve a sensitivity of system; the steps are as follows:

a first step of constructing a measurement system, wherein the measurement system comprises a microscopic measurement system and a motion control mechanism;

① The microscopic measurement system comprises the following components: two cameras of a same type, two tube lenses of the same type, two beam splitters of the same type, an objective lens, a stage, a converging lens and a light source; among them, arranging a first camera, the first tube lens, the first beam splitter, the second beam splitter, the objective lens and the stage coaxially from top to bottom in the setup to form an imaging light path; using the stage to place the object under test at a proper position; arranging the second tube lens and the second camera on the light path of the first beam splitter in turn; and arranging the converging lens and the light source on the light path of the second beam splitter in turn to form an illumination light path;

②  the relative distances between the two sets of tube lenses and cameras are different, and the difference is fixed, which is a preset amount of 10~100 μm, when the first camera images a point clearly, the second camera captures a de-focused image of the point;

③ the motion control mechanism comprises a motor and a grating, which are used to control an axial movement of the objective lens or the entire microscopic imaging system;

a second step of axial scanning and focusing evaluation:

① fixing the object under test on the stage, adjusting the objective lens or the entire microscopic imaging system, and determining the axial positions of highest and lowest points of the object under test that can be clearly imaged, so as to set a scanning range and a scanning step;

② according to the scanning range and scanning step, capturing a set of image sequences containing n images by using the two cameras, denoting a set of image sequences as $I_i^1$, $I_i^2$, (i=1, 2, ..., n), respectively;

③ selecting the focusing evaluation function, calculating pixel-level focusing for the above image sequences, for m pixels, obtaining m focusing evaluation function curves, and denoting the m focusing evaluation function curves as $S_i^1$, $S_i^2$, (i=1, 2, ..., m), and using them to represent the degrees of focusing at different scanning depths;

a third step of performing differentiation and three-dimensional reconstruction:

① wherein each lateral position has only one optimal focusing depth, and the focusing evaluation function curve corresponding to the lateral position has a maximum value at the optimal focusing depth, $S_i^1$ and $S_i^2$ increase first and then decrease with respect to the scanning depth, the differentiation between $S_i^1$ and $S_i^2$ is defined as a new evaluation function curve $F_i$, in which the optimal focusing depth corresponds to a zero point of the evaluation function, a depth change of the optimal focusing depth of evaluation function curve $F_i$, is steeper, yielding a higher sensitivity to the depth change and stronger anti-noise capability;

② fitting the zero point for $F_i$ respectively, combining all the lateral positions, denoting a height map composed of all the focusing depths as a restored three-dimensional topography.

2. The three-dimensional topography recovery method based on dual-channel differentiation according to claim 1, the focusing evaluation function is selected from the Sobel function and the Laplace function.

\* \* \* \* \*